US007693862B2

(12) United States Patent
Chau et al.

(10) Patent No.: US 7,693,862 B2
(45) Date of Patent: Apr. 6, 2010

(54) USER INTERFACE MECHANISM TO FORMULATE COMPLEX QUERY AGAINST AN ENTITY RELATIONSHIP MODEL

(75) Inventors: Carolyn Khanh Chau, Carnation, WA (US); Jason David Carlson, Redmond, WA (US); Robert Alan Meyers, Redmond, WA (US); Brian Lee Welcker, Seattle, WA (US); Lisa Renee Mueller, Sammamish, WA (US); Aaron Stephen Meyers, Provo, UT (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 11/170,418

(22) Filed: Jun. 29, 2005

(65) Prior Publication Data

US 2007/0005562 A1   Jan. 4, 2007

(51) Int. Cl.
G06F 17/30   (2006.01)
(52) U.S. Cl. .................... 707/102; 707/101; 707/103 R
(58) Field of Classification Search .................. 707/1–5, 707/10, 100–103 Z
See application file for complete search history.

(56) References Cited

U.S. PATENT DOCUMENTS 6,640,221 B1 * 10/2003 Levine et al. .................. 707/3

| 2004/0006570 | A1 * | 1/2004 | Gelb et al. ................... 707/102 |
| 2005/0015368 | A1 * | 1/2005 | Payton et al. ................... 707/4 |
| 2005/0021538 | A1 * | 1/2005 | Meyers et al. ................ 707/100 |
| 2006/0129590 | A1 * | 6/2006 | Brown et al. ................. 707/102 |

OTHER PUBLICATIONS

Zoeller et al., "Dynamic self-configuring methods for graphical presentation of ODBMs objects", Data Engineering, 1992. Proceedings. Eighth International Conference on (0-8186-2545-7), Feb. 2-3, 1992. p. 136-143. Download: http://ieeexplore.ieee.org/stamp/stamp.jsp?isnumber=5565&arnumber=213209&punumber=386?tag=1.*

* cited by examiner

*Primary Examiner*—Shahid A Alam
*Assistant Examiner*—Hares Jami
(74) *Attorney, Agent, or Firm*—Woodcock Washburn LLP

(57) ABSTRACT

A graphical user interface and method of use thereof that allows users to interact with an entity relationship model. The user interface includes zones that allow users to navigate among the entities, roles and fields to create queries that are run against the model. Clicking on an entity in the shows the available fields for the entity. Users can drag and drop entities and fields onto a design surface to quickly and easily build queries. Rules are applied when either an entity or a field is dropped onto the design surface based upon the item being dropped (either an entity or a field), the position of the drop and also the properties that are associated with the item. Entities may be grouped and filtered to sort and limit the results of the query. After query is run, the results may be displayed in a separate area to the user.

14 Claims, 18 Drawing Sheets

Fig. 5

| Title | Last Name | First Name |
|---|---|---|
| Inside Sales Coordinator | Callahan | Laura |
| Sales Manager | Buchanan | Steven |
| Sales Representative | Davolio | Nancy |
| | Dodsworth | Anne |
| | King | Robert |
| | Leverling | Janet |
| | Peacock | Margaret |
| | Suyama | Michael |
| Vice President, Sales | Fuller | Andrew |

Total Employees: 9

All Employees

Fig. 9

| Country | #Orders | Last Name | First Name | #Orders | #Order De | Sum Amoun |
|---|---|---|---|---|---|---|
| UK | 224 | Buchanan | Steven | 42 | 117 | $75,567.75 |
| | | Dodsworth | Anne | 43 | 107 | $82,964.00 |
| | | King | Robert | 72 | 176 | $141,295.99 |
| | | Suyama | Michael | 67 | 168 | $78,198.10 |
| | | Total | | 224 | 568 | $378,025.84 |
| USA | 606 | Callahan | Laura | 104 | 260 | $133,301.03 |
| | | Davolio | Nancy | 123 | 345 | $202,143.71 |
| | | Fuller | Andrew | 96 | 241 | $177,749.26 |
| | | Leverling | Janet | 127 | 321 | $213,051.30 |
| | | Peacock | Margaret | 156 | 420 | $250,187.45 |
| | | Total | | 606 | 1,587 | $976,432.75 |
| Total | 830 | | | 830 | 2,155 | $1,354,458.59 |

Fig. 12

Filter Data

Explorer:
- Order Detail
  - Order
  - Product

Order Details with:

Country equals USA and

City in this list: London, Redmond and

Title equals Vice President, Sales and

Order Year equals (unspecified)

and ▼ equals (unspecified)
- And
- Or

— 216

New Group ▼

Fields:
- #Order Details
- Unit Price
- # Quantity
- Discount
- Amount

▼ When adding a new condition, apply to all data in my report

Help    OK    Cancel

USER INTERFACE MECHANISM TO FORMULATE COMPLEX QUERY AGAINST AN ENTITY RELATIONSHIP MODEL

FIELD OF THE INVENTION

This invention relates in general to the field of entity relationship modeling. More particularly, this invention relates to a user interface for formulating queries against an entity relationship model without requiring knowledge of entity relationships on the part of the user.

BACKGROUND OF THE INVENTION

An entity relationship (ER) diagram is a graphical representation of an organization's data storage requirements. Entity relationship diagrams are abstractions of the real world which simplify a problem to be solved while retaining its essential features. Entity relationship diagrams have three different components: entities, attributes and relationships. Entities are the people, places, things, events and concepts of interest. Entities may represent collections of things, for example, an employee entity might represent a collection of all the employees that work for an organization. Individual members (employees) of the collection are called occurrences of the employee entity.

Entities are further described by their attributes or data elements. These are the smallest units of data that can be described in a meaningful manner. For example, an employee entity may have the following attributes: employee number, last name, first name, date of birth, telephone number, department, etc. Frequently, a meaningful relationship exists between two different types of entity. For example: employees work in a department, lawyers advise clients, equipment is allocated to projects, truck is a type of vehicle, etc.

There are potentially three types of relationships which can exist between two different entities: one-to-one, one-to-many and many-to-many relationships. A one-to-one relationship is when a single occurrence of an entity is related to just one occurrence of a second entity. For example, a roof covers one building; a building is covered by one roof. One-to-many relationships are when a single occurrence of an entity is related to many occurrences of a second entity. For example, an employee works in one department; a department has many employees. Many-to-many relationships are when many occurrences of an entity are related to many occurrences of a second entity. For example, equipment is allocated to many projects; a project is allocated many items of equipment.

Another problem is that while building queries or asking questions against an ER model is difficult, there is a desire to maintain power and flexibility in the questions that may be asked. ER models are extremely flexible in the ways that entities can be related to other entities. With this flexibility comes complexity especially when trying to formulate queries or questions against this model. The problem is magnified when the individual trying to formulate the query is not familiar with relational design.

SUMMARY OF THE INVENTION

A graphical user interface and method of use thereof that allows users to interact with an entity relationship model. The user interface includes zones that allow users to navigate among the entities, roles and fields to create queries that are run against the model. Clicking on an entity in the shows the available fields for the entity. Users can drag and drop entities and fields onto a design surface to quickly and easily build queries. Rules are applied when either an entity or a field is dropped onto the design surface based upon the item being dropped (either an entity or a field), the position of the drop and also the properties that are associated with the item.

When an entity is dropped onto the surface, a group is created that represents the identity of the entity. The identity of an entity is determined to be a field or a set of fields that together identify instances of the entity. When a field is dropped on the surface, a group is created for that field, unless the field is dropped to the right of any field in an entity group from the fields' containing entity. In this case, the field will be added to the existing entity group.

A primary entity (i.e., the focus of the query) for a report may changed based upon the user's navigation and selection of items for their report.

A set of filters is provided that limits the data returned by the query. The filter may be selected from a menu of existing filters, or created by the user. After a report is run, the results may be displayed in a separate area to the user.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 2-18 illustrate exemplary user interfaces by which complex calculations may be created.

DETAILED DESCRIPTION OF PREFERRED EMBODIMENTS

Exemplary Computing Environment

Figure 1:
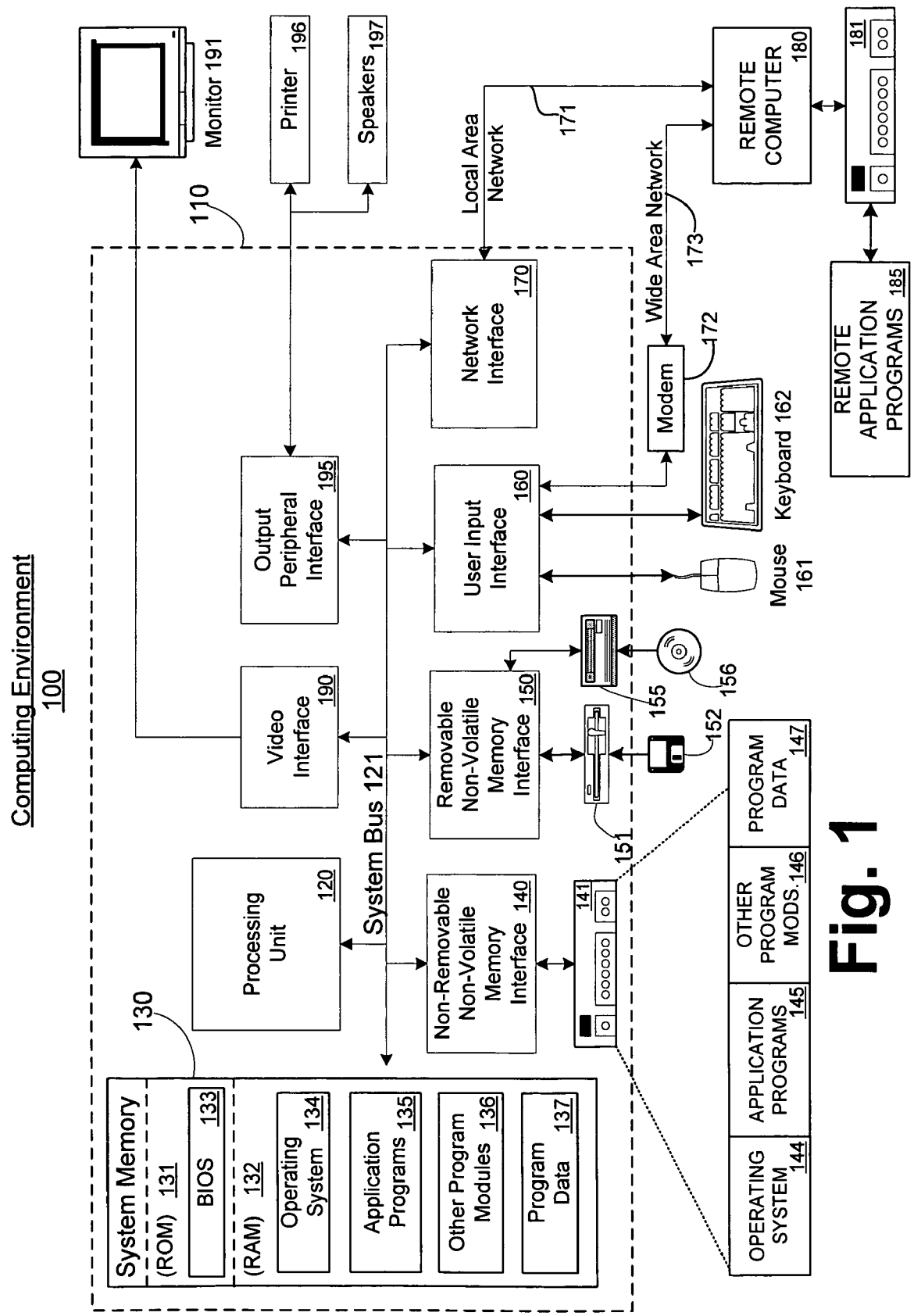
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

Figure 2:
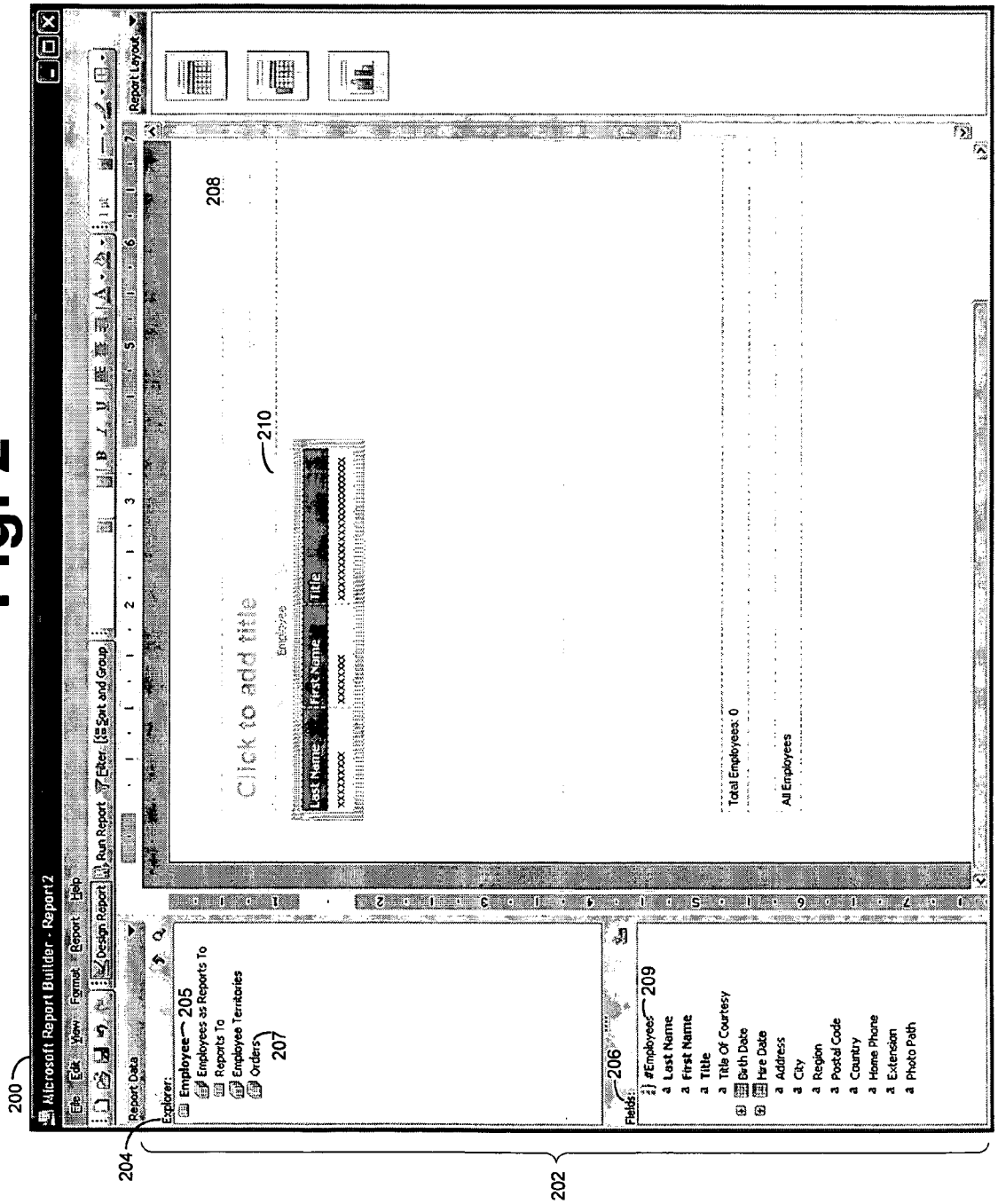

FIGS. 2-13 provide an exemplary usage of the UI of the present invention. As will be described below, the present invention is directed to a set of UI zones where users can interact with an ER model and by dragging and dropping parts of the model, formulate a query. FIG. 2 shows the UI 200 for building a query. The left hand Report Data panel 202 allows users to navigate/explore the metadata available for them to use in building their query. The Explorer 204 shows Entities 205 and roles 207, the Fields area 206 show the list of available fields 209 for the entity or row. The explorer zone 204 displays all of the entities that the user has access to in the model, and once a "primary" or "base" entity has been chosen, the explorer zone 204 serves as the mechanism to traverse the model from this entity.

Users add items by dragging and dropping them from the Report Data area 202 to a design surface 208. Users can drag and drop Entities 205, Roles 207 and Fields 209 on to the design surface 208. When dragging an entity 205, the identifying attributes of the entity are added to the query. The entity for the first item added to the report is the base or primary entity (these terms are used interchangeably herein) and it becomes the current entity context of the query. Identifying attributes are the fields 207 that identify a unique instance of the entity. For example, Employees are identified in this set of data by their Last Name and First Name, as shown on the design surface 208. When a different item is selected for the query (either an entity or field), the Explorer changes from a list of all entities to reflect a new current context of the query. The Explorer 204 then shows all the roles 207 from that entity 205. Roles 207 reflect all items related to the current entity.

Figure 3:
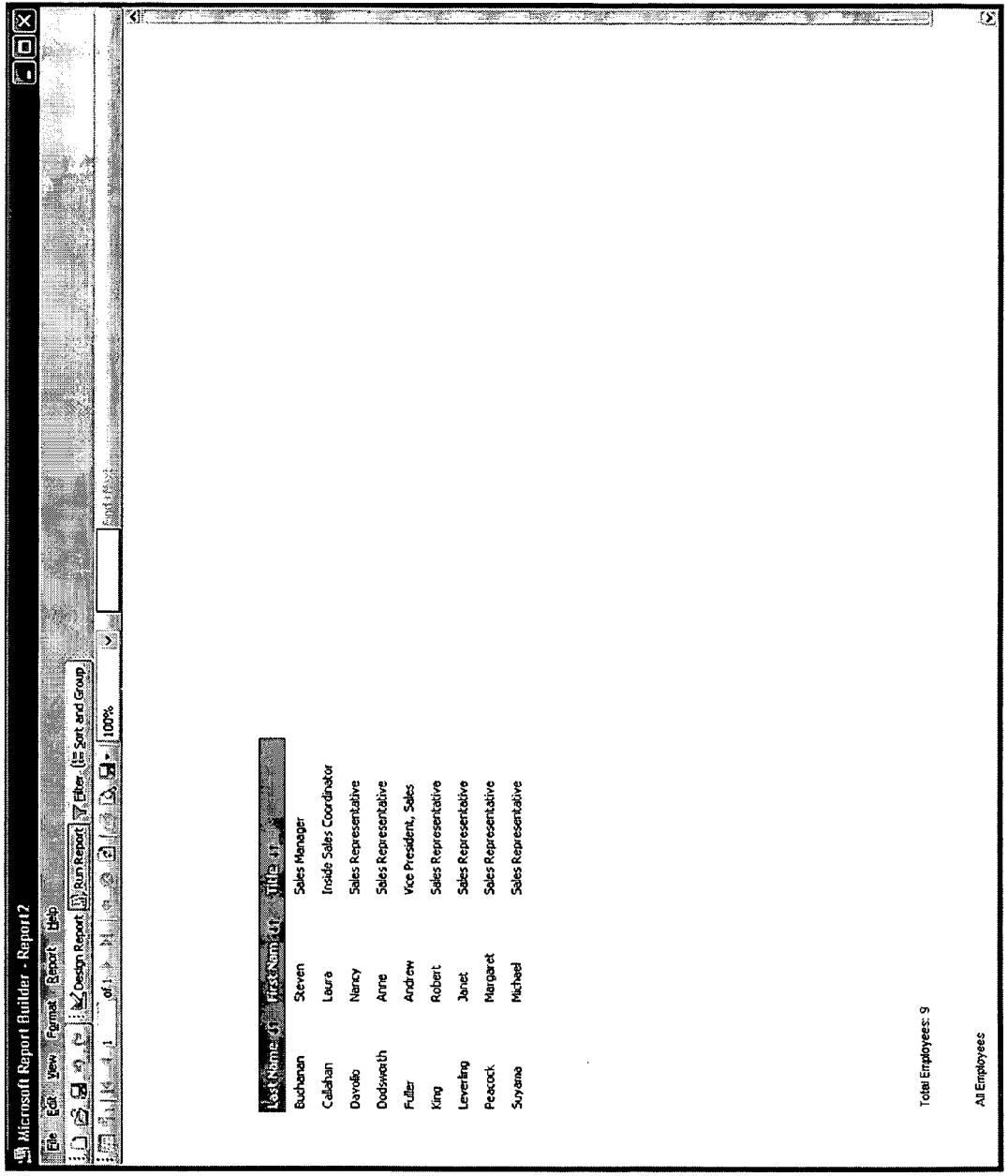

As will be understood from FIG. 2, there is an example of dragging a field onto the design surface where Title is added to the right of Last and First Name. A gray tab 210 on top of the fields indicates a group. Groupings affect the organization of the data. As shown, there is only one group: the Employee group 210. When adding a field to the right side of a group, if the group is the entity group for the field, the field is added to the entity group (as shown in FIG. 2 where Title was added to the right). If the group is not the entity group for the field, a new field group for the field is created. FIG. 3 shows results if a query is run at this point, which generates a list of last names, first names and titles for each employee.

Figure 4:
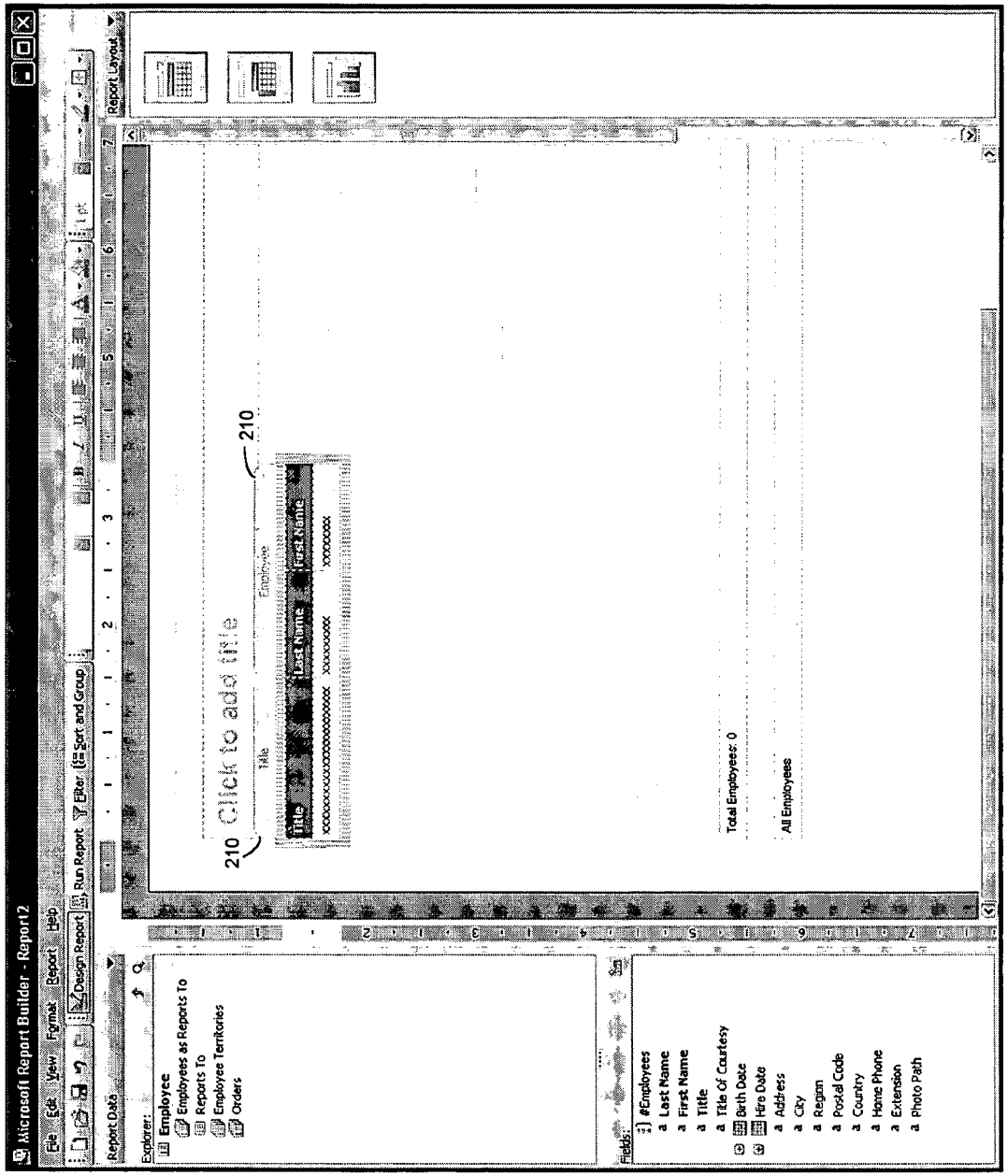

As shown in FIG. 4, when a field is added to the left, a new group 212 for that field (i.e., Title) is created unless the field is one of the identifying attributes of the entity 205, in which case an entity group is created (or the field is added to the existing entity group). In this structure, all employees will be grouped by their title (i.e., all managers will be listed together, all vice presidents will be listed together, etc.). FIG. 5 shows query results with title as a grouping. The exemplary query of FIGS. 4-5 may contain as many groups as the user desires. Users have full control over the groupings in the query via the UI. Fields can be dragged and dropped to the group tabs to add an item to a group or change the "default" grouping.

Figure 6:
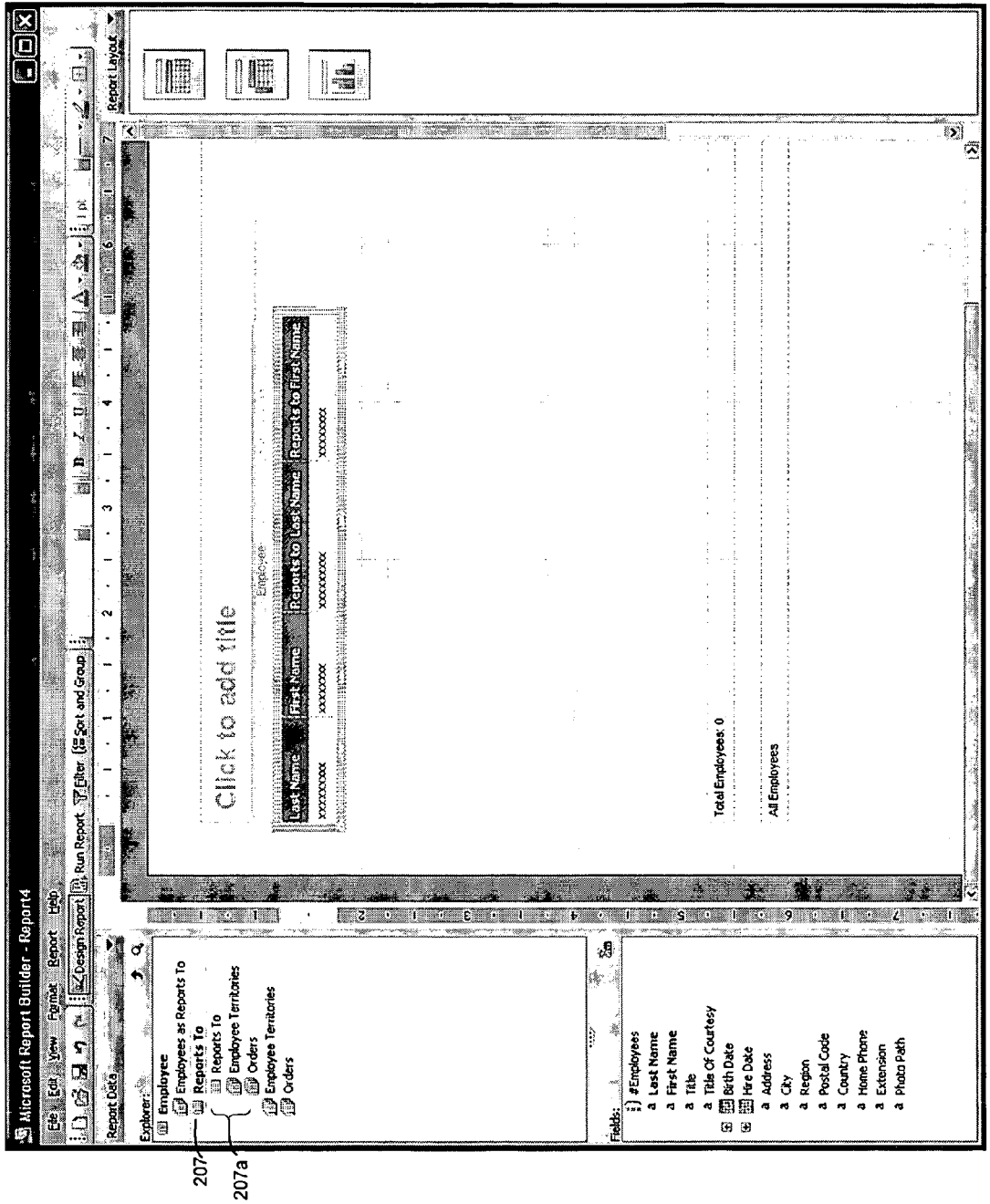

As shown in FIG. 6, when the user clicks on a role 207, the roles 207a associated with that role are then shown. The depth or breadth of navigation depends on the complexity of the underlying data. As long as there are relationships, users can continue to navigate through the roles 207. The card icons next to the roles 207 in the explorer indicate the cardinality of the role to its "ancestor" role. For example, "Employee" to "Reports To" is a "to one" role and "Employee" to "Orders" is a "to many" role. Employees only report to one person, but each employee may have many orders associated with them.

Figure 7:
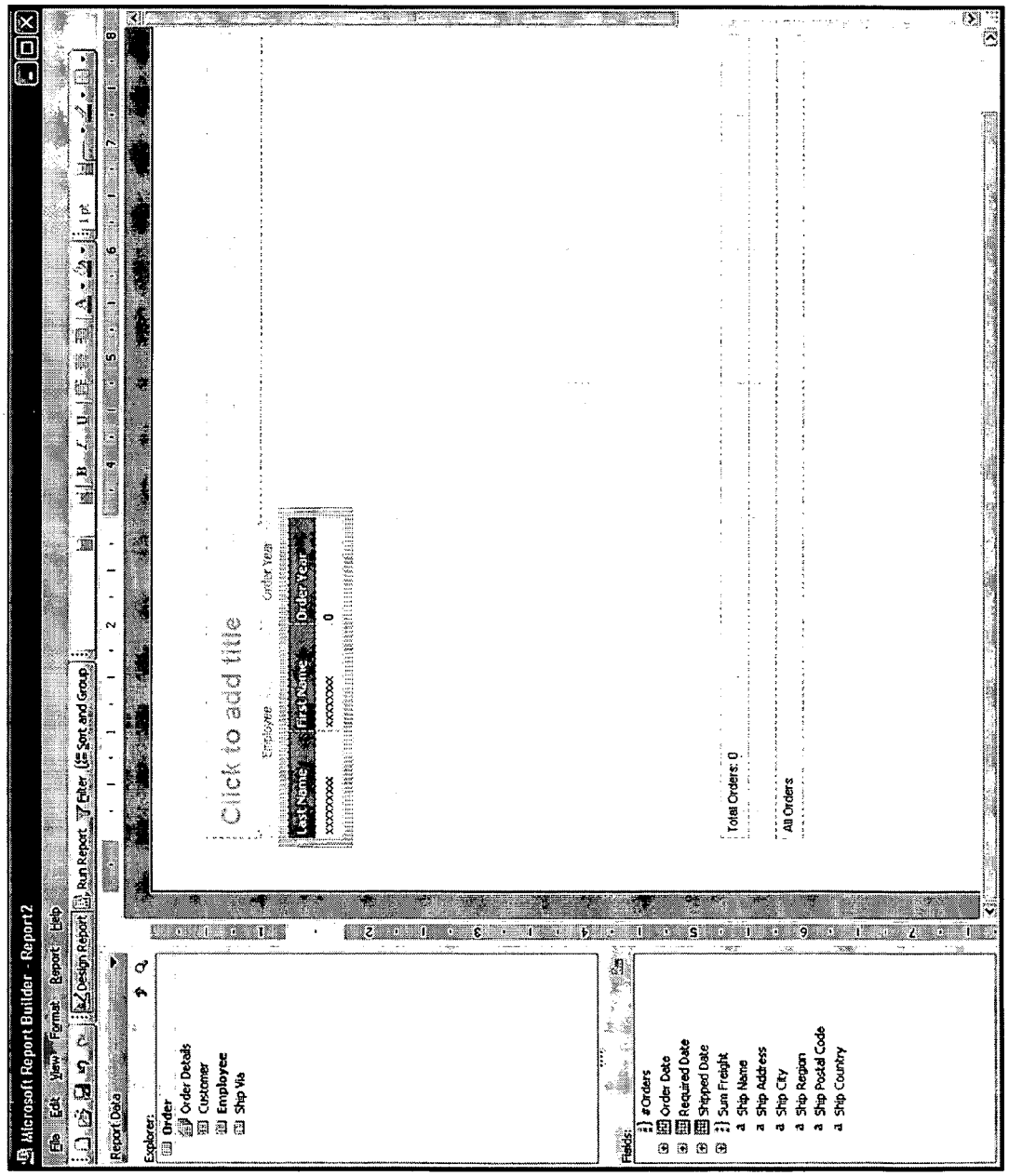
Figure 8:
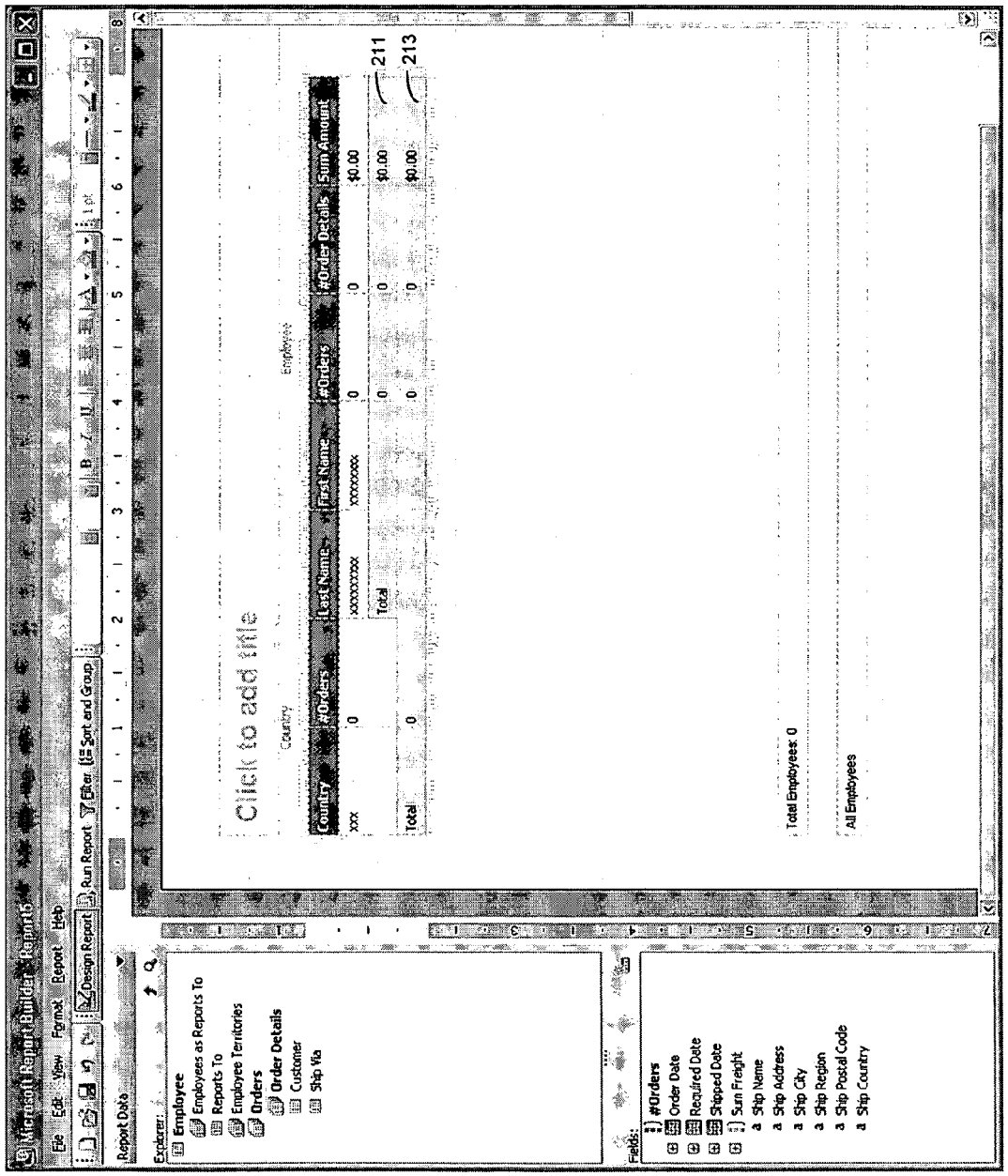

When scalar fields (as opposed to aggregate fields) from a related role that is "to one" from the context entity are added to the right of the existing items, the fields are added as additional details to the existing group. FIG. 6 shows adding "Reports To" identifying attributes to the Employee group. As shown in FIG. 7, if a user adds fields from a "to many" role from the context entity or a role that crosses a "to many" role, the context entity changes to the entity that was a "to many" role. For example, when "Order Year" is added to the Employee report, the context entity changes to the Order.

Aggregates, however, when added to the report, do not change the base entity. Aggregates are added as details to the group to which they are added. For example, in FIG. 8, #Orders (number of orders) from Orders, #Order Details from Order Details and Sum Amount from Order Details is added to the Employee report. This example also shows how subtotals 211 and grand totals 213 are added automatically when aggregates are added to the query. Subtotals are added per group in the query. FIG. 9 shows the results of previous report created in FIG. 8. This report shows employees grouped by country. For each employee, show the number of Orders, #Order Details and Sum Amount. Also for each country, show the total number of orders for the country.

When one or more aggregates is added to the design surface and no groups are available to associate with the aggregate, a Total group is created. Total groups may be denoted in the UI with ( ) around the name of the group. When a field or entity group is added to a query with only a total group, the total group is removed and the aggregates are added to the field or entity group. If all field or entity groups are removed, the aggregates revert to a total group.

FIGS. 10-13 illustrate filtering. The present invention contemplates two types of reports: list reports and summary reports. List reports are reports where the user is interested in constraining a specific list and then return info related to that list. List reports are typically performed in the context of a specific entity. A summary report is a report where users constrain data to answer a specific question. The base entity in summary reports may be changed as needed to return the desired information. These two options are encapsulated in the check box 214 at the bottom of the filter page. The default option is to create summary reports. To create a list report (not allow the base entity to change), the option 214 is unchecked.

Figure 10:
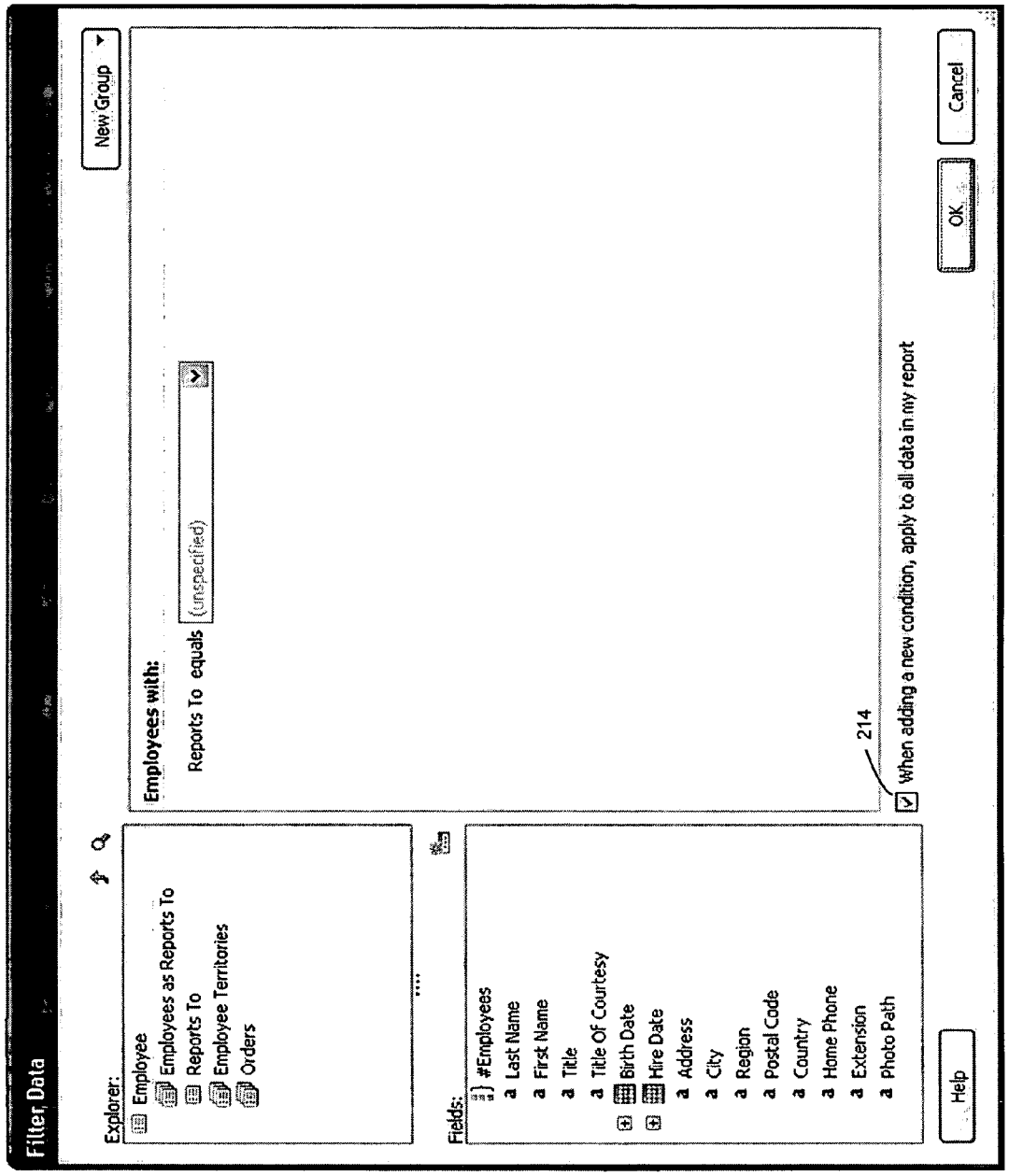

As shown in FIG. 10, if an entity is dropped onto the filter surface that is to one from the base entity, it adds an entity reference criteria to the filter design surface. In FIG. 10, "Reports To" entity is dropped to an Employee filter. This allows the report to be filtered by specific instances of the Reports To entity.

Figure 11:
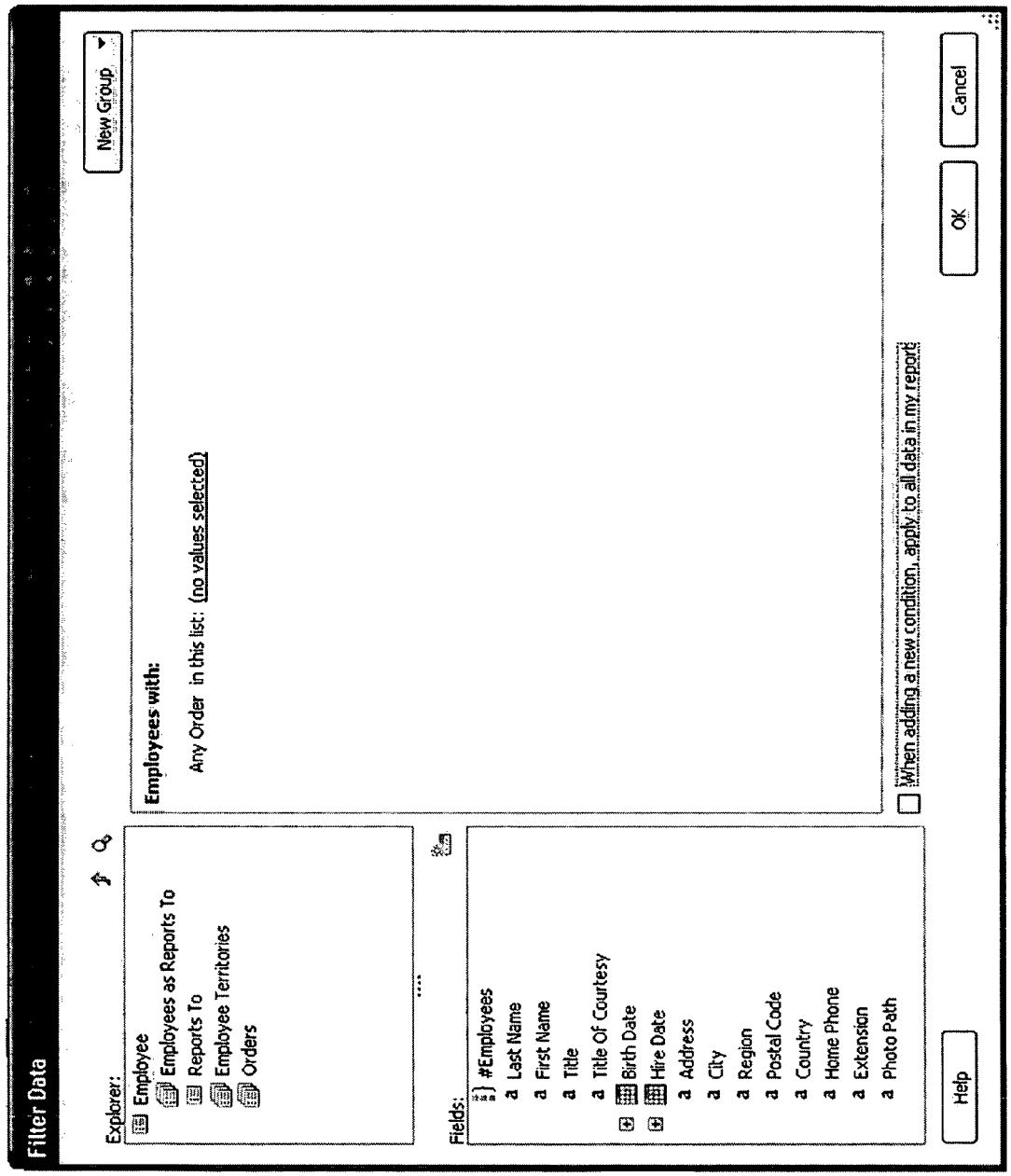

FIG. 11 illustrates when an entity that is "to many" from the base entity adds an "Any <entity> in this list" clause to the filter surface when creating a list report. In the example of FIG. 11 Orders is dropped in an Employee report. This allows the user to filter the report to return Employees who had any orders meeting the criteria. User can change the logical operator for any such entity filter reference to "Any, all, none of, not all of." (similar to aggregate filter groups).

A drop of a field from the base entity or any entity that is to one from the base entity adds a <field> reference clause to the filter.

When creating a summary report, adding a field reference from an entity that crosses a "to many" path from the base entity causes the base entity of the query to change to the last entity that is to many before a to one entity and then a field reference filter clause is added to the design surface. For example, a user begins with an Employee query, and then adds a filter and a Ship Country from the Orders role to the filter. The base entity would change from Employee to Order and a Ship Country clause is added to the filter.

Adding a field reference to the filter from a "to many" relationship from the base entity when the user selects to create a list report adds an aggregate filter group to the filter surface. An aggregate filter group allows users to specify the filter for the related entity that will apply to the base entity. Aggregate filter groups have one of four logical operators: Any, all, none of, not all of. The default is Any.

As shown in FIG. 12, filter conditions can be strung together with a set of Ands and Ors 216. Flipping an And or causes a logical group to be created for the two conditions on either side of the And or. Logical groups also encompass the idea of "not," so there are four logical groupings correspondingly: All, Any, None, Not All.

Figure 13:
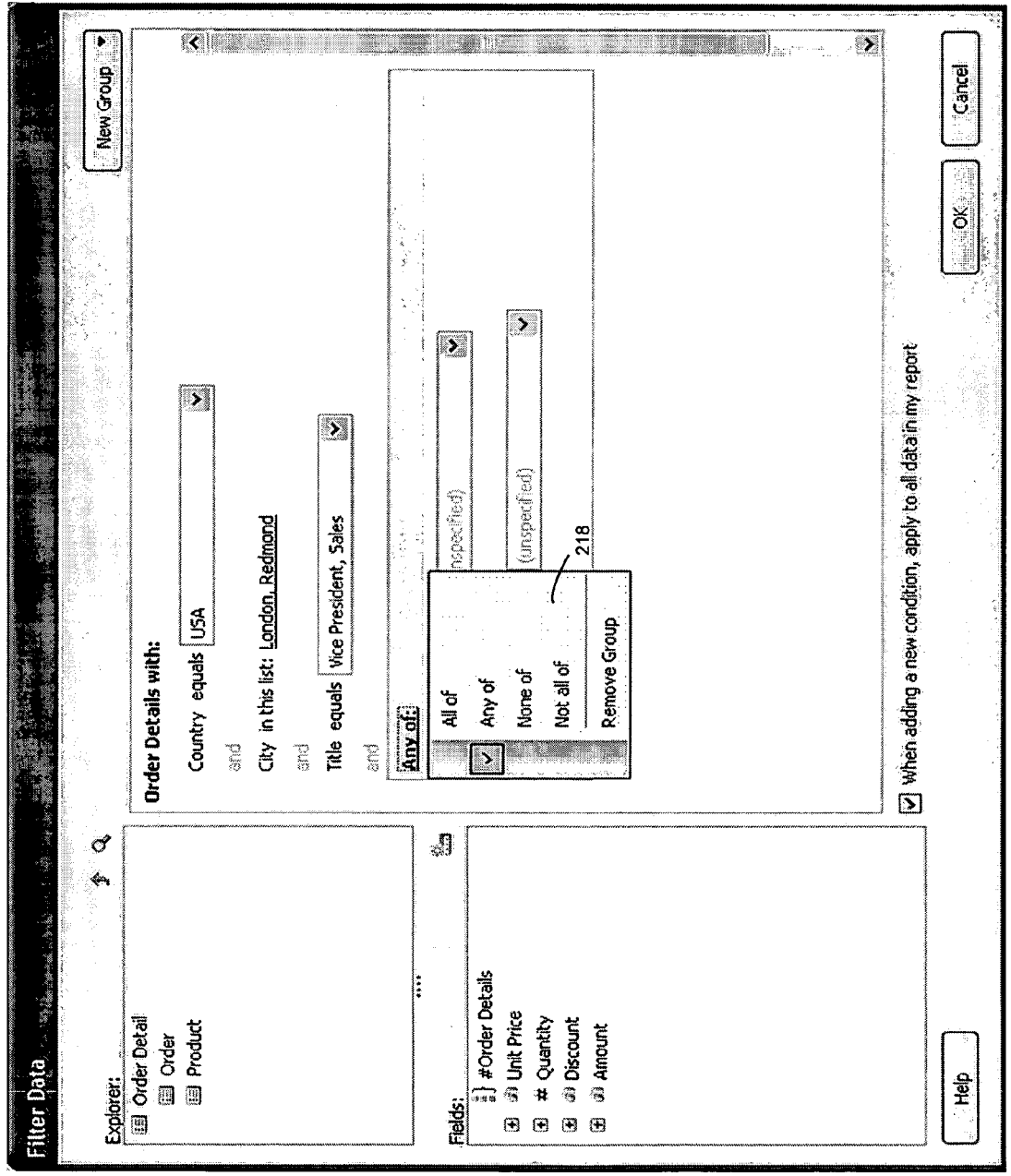

As shown in FIG. 13, the logical operator for a group can always be changed by the user by simply selecting one of the four options 218. Logical filter groups can be nested any number of levels deep within the filter. Aggregate filter groups can also be nested within each other. Logical filter groups and aggregate filter groups can also be nested within each other.

Figure 14:
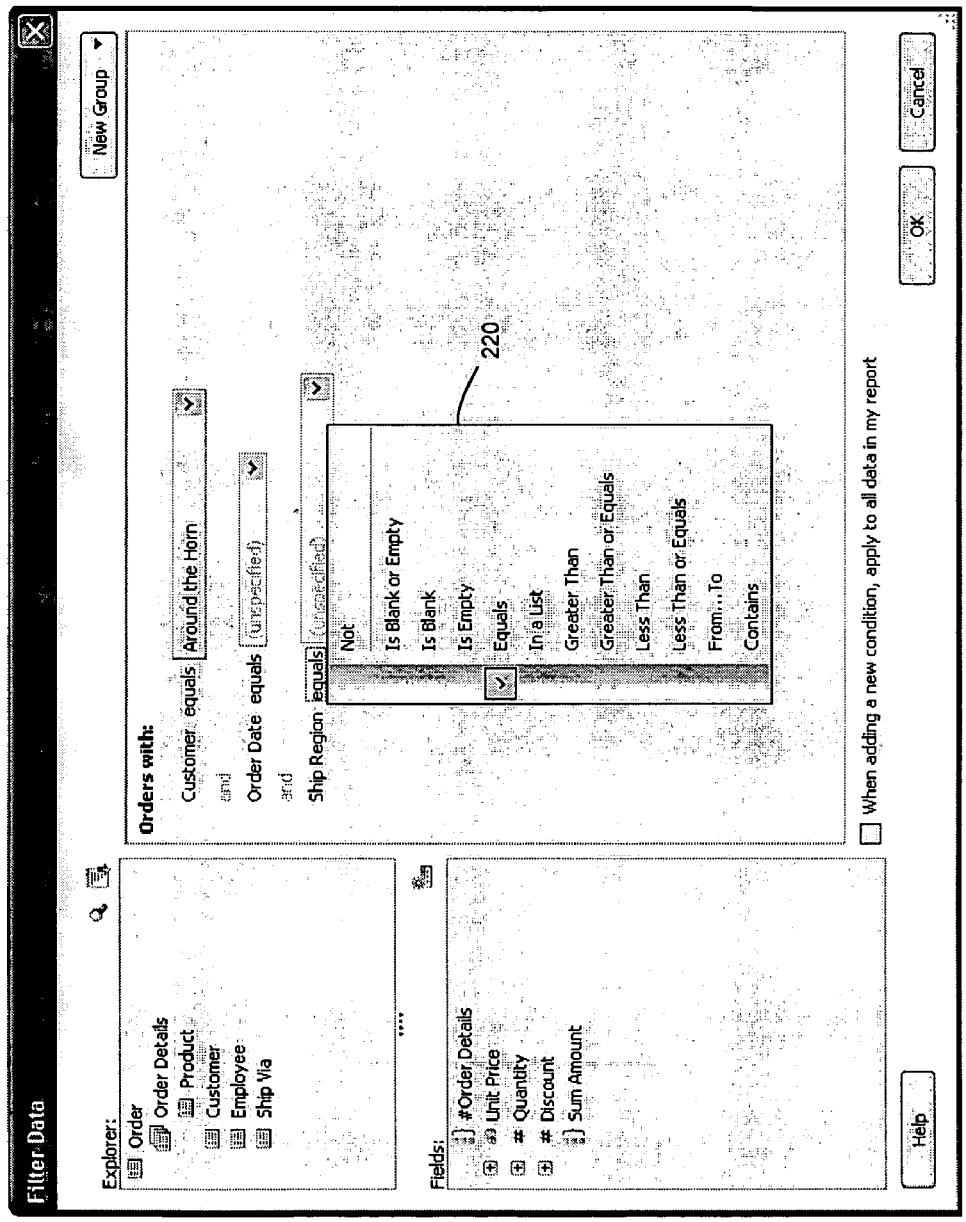

Referring to FIG. 14, filter conditions with field references allow users to filter via a dialog 220 that provides the following filter operators: Is blank or empty, is blank, is empty, equals, in a list, greater than, greater than or equals, less than, less than or equals, from . . . to, and contains. Any filter clause can additionally be negated with a not.

Filter conditions referencing entities on the filter design surface allow users to select instances of the entity.

Instances of an entity are shown to the user as the concatenated values of the identifying attributes of the entity where each attribute is separated by a comma. The following filter operators can be used in conjunction with entity filter conditions: equals and in a list. Not can be applied to either of these filter operators.

Figure 15:
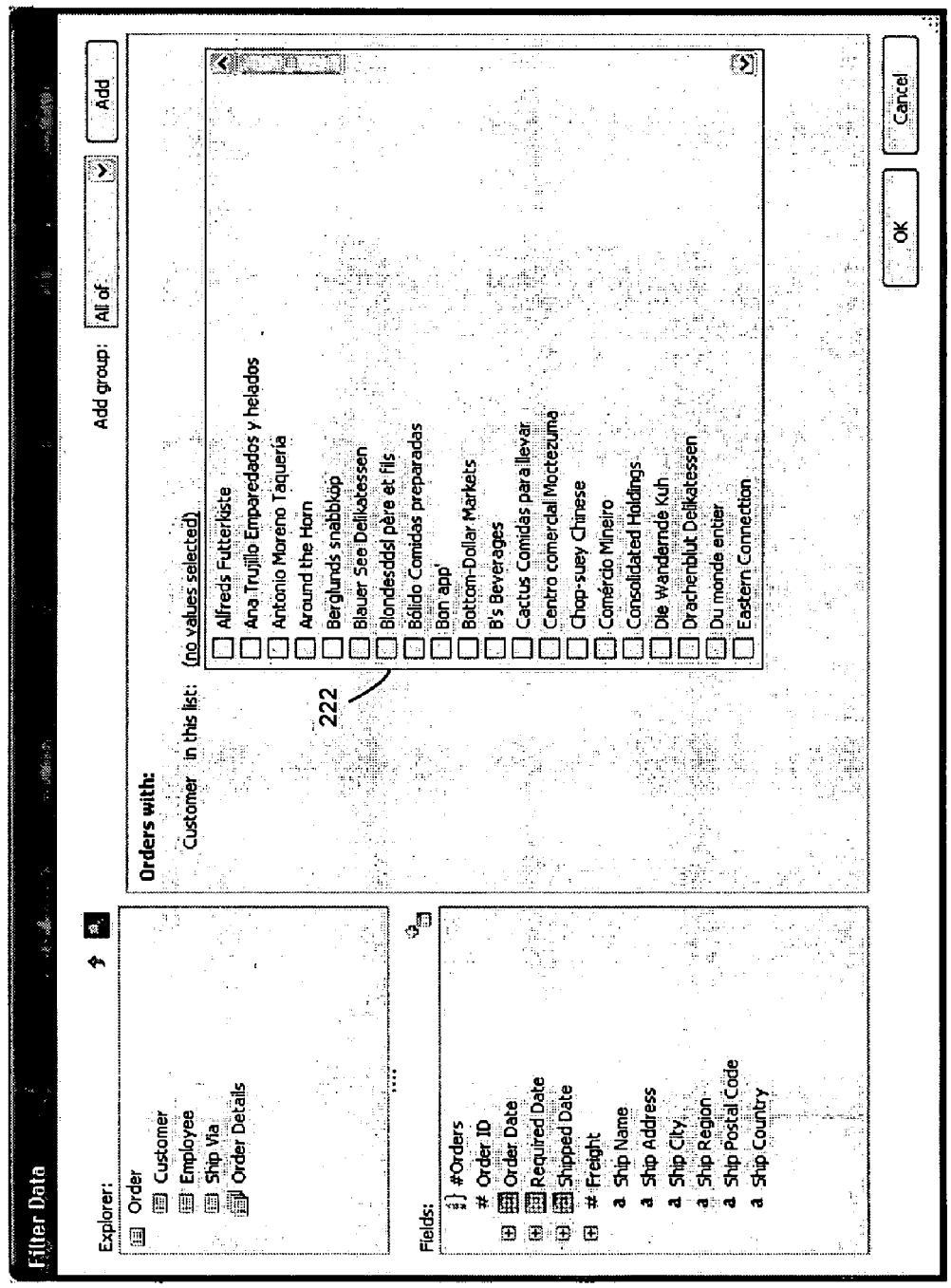

If the number of unique values of an attribute or unique instances of an entity is considered small by the database administrator, an option may be set on the entity or attribute to display a simple dropdown list for selecting values or instances of the item. FIG. 15 illustrates a Dropdown UI 222 that may be used when presenting a simple drop down. The drop down 222 allows users to check and uncheck values. When a new condition is created, no values are selected (i.e., checked). Previously selected items in the list are preserved (i.e., shown checked) when a user edits values. Users can modify their selections by checking additional items or unchecking previously checked items.

Figure 16:
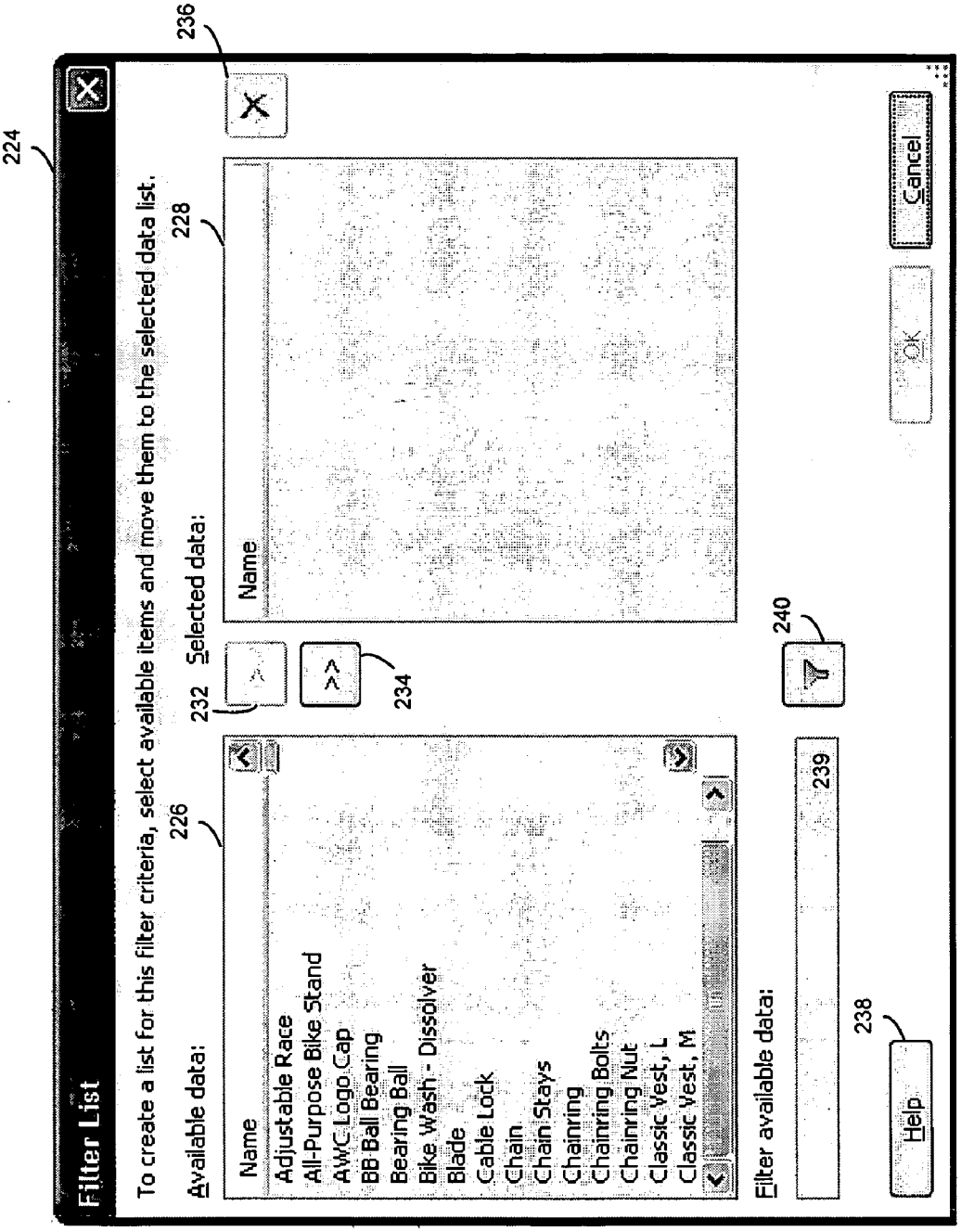

If the number of unique values of an attribute or instances of an entity is considered to be of intermediate size (i.e., too numerous for the dropdown UI 222) by the database administrator, a Filter List UI is used. Referring to FIG. 16, the Filter List UI 224 presents a dialog box 226 for the user to select the desired instances. Once selected, the instances are shown in a second dialog box 228.

When the user first creates the filter condition that causes the Filter List dialog 224 to launch, the Available Items list box 226 is populated with the full list of instances for the entity or values for an attribute. Items are preferably listed in ascending alphabetical order. Users can select (including multi-select) items in the list and move them over to the "Selected Items" listbox 228 by clicking a button 232. Clicking a second button 234 moves all items from the available list to the selected list.

To narrow the items in the available list, users may use a "Filter available data" area 239 below the available list 226. Users can type the text to use for searching the available list. The search is a simple "contains" search but may also present more advanced searching including "begins with" or "ends with" options. For example, in a list of street names, the user can type "North" which searches for all entries in the available list that contain the word "North". The search searches the entire continuous string entered by the user so "North east" searches does not return "North First East". The search is executed if the user clicks on the filter button 240 or presses the enter button when focus is set in the textbox and the string is not empty. To clear the filter, users can press a Clear button or delete any existing string in the textbox and press the enter button.

The Selected Items list 228 shows the values that have been added by the user to the list. Users can multiselect (shift click or ctrl click) and select all (ctrl-A) when the focus is set on the listbox 228. To remove selected items in the list, users may click a delete button 236. All selected items are removed from the "Available Items" list 226 when selected and returned to the "Available items" list 226 when removed from the selected data list 228.

A help button 238 is provided that launches help for this dialog 230. OK accepts all changes and exits the dialog. It is acceptable to exit the dialog with no items in the Selected Items area. Cancel ignores all changes and exits the dialog.

For editing, the Filter List dialog 224 may be used with any previously selected items in the selected items list 228. The Available Items list 226 shows all instances for the entity except those in the Selected Items list.

If the number of unique values of an attribute or instances of an entity is so large that any list is considered unusable by the database administrator, the user may be required to create a filter to limit the list for selection. An example, a company may have millions of customers. For selecting instances of customers, users may be required to create a filter such as customers with addresses in a certain zip code or customers who purchased a certain product before a list of customers is shown to the user for selection of instances to include in the main report filter.

Figure 17:
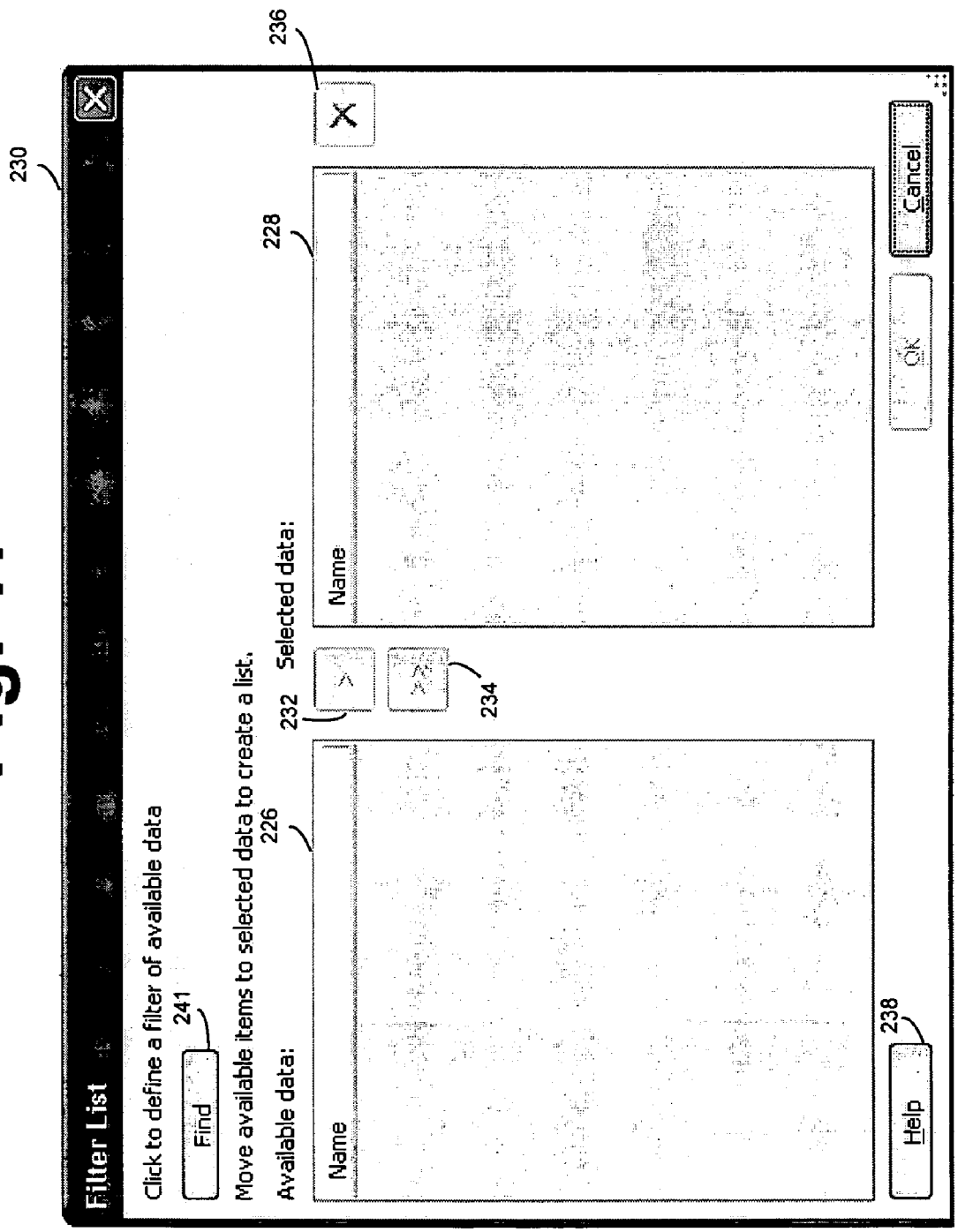

Referring now to FIG. 17, a UI is shown similar to FIG. 16 with an additional Find option for the user to first create a filter to narrow down the instances before they are populated into a list 226 for selection in correspondence with a list of values that is too large to automatically display in a list.

Figure 18:
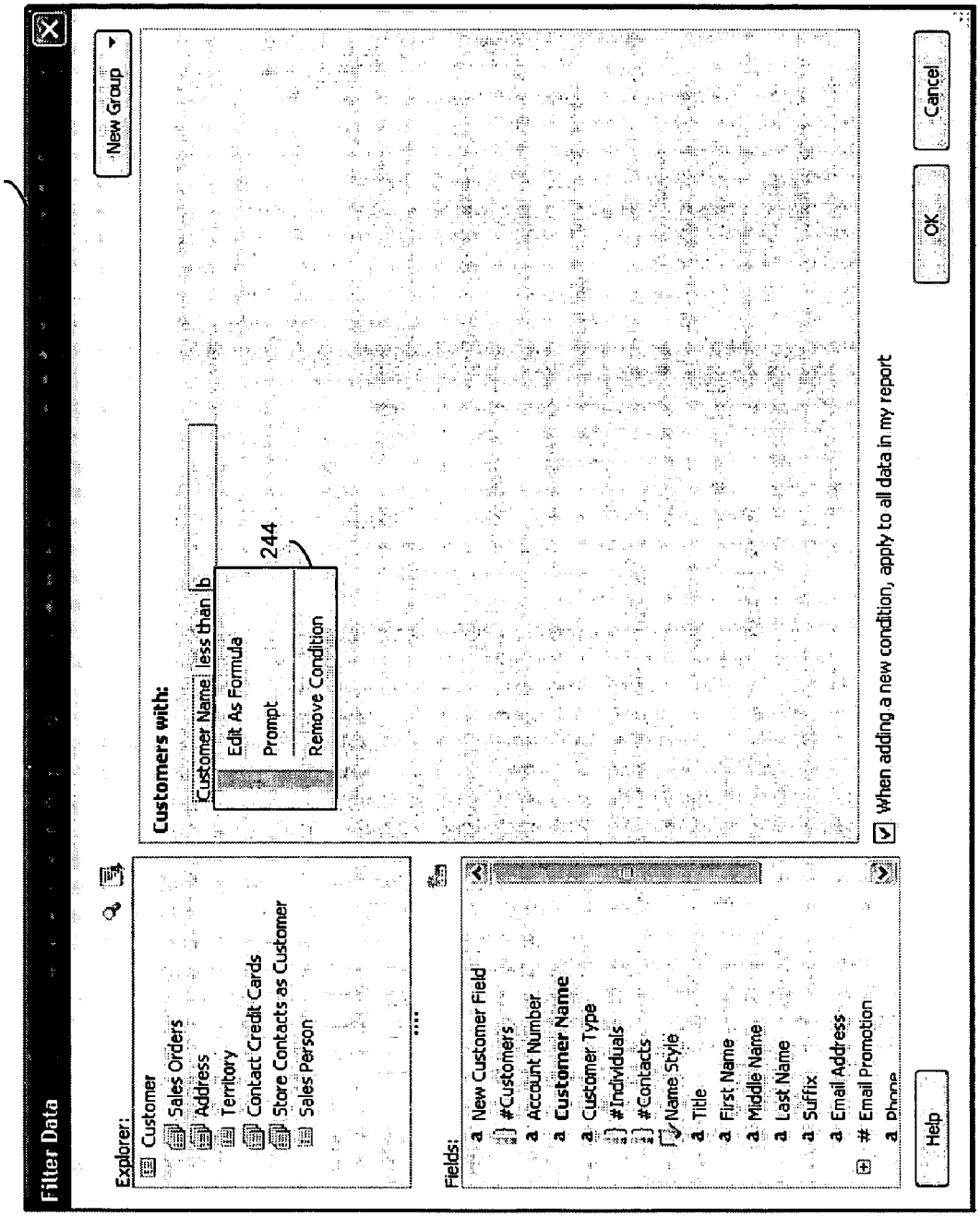

Find 241 launches the full filter dialog 242 of FIG. 18. A context is set at the current entity for which the user wants to select instances. The user then builds a valid filter and clicks OK on the filter dialog. On closing the filter dialog 242, the filter is executed and the list of valid instances is returned and populated in the "Available Items" list 226. Users may then select the items they want from the Available list 226 and move them to the "Selected Items" list 228.

When items have previously been selected, they are populated in the Selected Items list 226 on re-launch of the dialog 230 to edit the list. The Available Items list 228 is preferably empty, as previously available items based on any previous filter activity are not stored. Filters to create the Available Items list are cleared on exit of this dialog.

FIG. 18 also shows additional options 244 on filter clauses. For example, the options may include "Edit as Formula," "Promp," or "Remove condition." The filter condition can be edited as a formula, in which case a separate interface is shown to the user for manipulating the condition by including functions in the definition of the filter condition or additionally performing other enhancements to the filter condition. The "Prompt" check option can be set such that when the report is run the user is requested to supply a value for the filter condition. And the filter condition can be removed from the design surface and subsequently from the report.

Overview of the UI of the Present Invention

Thus, in view of the detailed description of the present invention provided above, below is a generalized overview of the operation of the UI that builds from the example of FIGS. 2-18.

By dragging either entities or fields onto the surface a user may build a query. The rules that are applied when either an entity or a field is dropped onto the design surface are determined by the item being dropped (either an entity or a field), the position of the drop and also the properties that are associated with the item, as follows:

1. When an entity is dropped onto the surface a group is created that represents the identity of the entity. The identity of an entity is determined to be a field or a set of fields that together identify instances of the entity.

2. When a field is dropped on the surface a group is created for that field, unless the field is dropped to the right of any field in an entity group from the fields' containing entity. In this case, the field will be added to the existing entity group.

3. When one or more aggregates is dropped on the surface, they are dropped to the right-most position in the group to which they are being dropped.

4. If an aggregate or aggregates is dropped first onto the design surface or when no other groups are in the query, the aggregate(s) are added to a total group.

5. Aggregates can be added to any group in the report (entity group or field group)

6. When all items within a group are removed, the group is also removed.

7. When all scalars within a group are removed, any aggregates within the group are merged to the now right-most entity or field group. If no such group exists, the group now without any scalars is converted to a total group.

8. Subtotals for all groups are automatically added on drop of an aggregate.

The primary entity for a report may change based upon the user's navigation and selection of items for their report, as follows:

1. When the user navigates a one to many relationship and adds a scalar field to their report, the primary entity will be changed to the entity of the new scalar field.

2. When the user navigates one or more one to many relationships and then navigates a to one relationship and selects a scalar, the primary entity will be the last to many entity before the first "to one" entity.

A similar mechanism is used for filtering. The navigation and fields' zone are the same, but the drop surface is a filter builder not the query builder. The rules are as follows:

1. Drop of an entity with a "to one" path from the base drops a reference to the entity.

2. Drop of an entity crossing a to many path item from the base drops an "Any" reference to the entity.

3. Drop of a field from a "to one" entity adds a reference to the field.

4. Drop of a field from an entity crossing a to many relationship adds an aggregate filter group.

5. The valid logical clauses for an aggregate filter group are the same as a non aggregate filter group: any of, all of, none of, not all of.

6. Aggregate filter groups can be nested within each other.

7. Entity reference filter clauses cannot be moved into aggregate filter groups.

Changing the primary entity refocuses the report to the new primary entity. This occurs in both references on the design surface and in filter. All paths in the report are "restated" in relation to the new primary entity. The model navigation zone is refreshed with this restatement. All items in the user report are inspected and expressions are converted as necessary to reflect the new primary entity.

As users add, remove and move fields on the design surface, a corresponding query is built in accordance with the above behaviors. The query includes references to fields, roles, and entities used in the report and expression paths indicating the relationships traversed in relation to the base entity of the report or relationships between fields and expressions in the query. Expression paths consists of path segments indicating steps along the expression path. For example, consider a report listing Employees grouped by their Sales Territory and including the number of Sales Orders for each employee and the Sum Amount for those Sales Orders. The base entity of said query would be Employee and the path to the Sum Amount field in one sample data set would be Employee to Orders to Order Details. Sample path segments would be Employees to Orders or Orders to Order Details. Expression conversion applies when moving any reference between groups on the design surface or groups within filter. The conversion rules are as follows:

1. "Across" denotes all path segments are 1:1 paths.

2. "Up" denotes all path segments are 1:1 or many:1 paths.

3. "Down" denotes all path segments are 1:1 or 1:many.

4. All expressions (and sub-expressions) are either anchored or float (i.e. are non-anchored). Anchored expressions are those which are only meaningful in a specific entity context. Entity references are anchored in the entity to which they refer. Attribute references which are not aggregates are anchored in the entity containing the attribute. Functions are anchored if any of their arguments are anchored (unless that argument takes a set and the function returns a scalar). All other (sub)expressions (including literals, null, parameter references and aggregate attributes) float. A non-empty expression path anchors an otherwise floating expression.

5. Float path is the path from the entity context in which a non-anchored expression is used to the entity context where the non-anchored subexpression(s) are defined. If the expression has multiple non-anchored subexpressions with different float paths the float path of the overall expression is the greatest common float path to each of the non-anchored subexpressions.

6. An "inverted" expression is an unanchored expression for which the first directional segment (ignoring one-to-ones) of its common float path is "up" (i.e., many-to-one). Inverted expressions are treated like anchored expressions until such time as the inverted portion of their common float path is removed. They are then treated like normal unanchored expressions.

7. When moving "across," the path from the old entity to the new one it is removed from any expression for which that path is a prefix, and added to any expression for which it is not.

8. When moving an anchored or inverted expression "up," the path from the old entity to the new one is removed from the path.

9. When moving a non-anchored expression "up," the reverse path (from the new entity back to the old one) is added to the float path.

10. When moving an anchored or inverted expression "down," the reverse path (from the new entity back to the old one) is added to the path.

11. When moving a non-anchored expression "down," the path from the old entity to the new one is removed from the float path.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer system comprising a monitor with a graphical user interface, the graphical user interface comprising:
   a first area to display data, the data representing entities comprised in a database, said first area comprising a fields area that displays fields for a selected entity; and
   a second area wherein said data is placed to create a query, an explorer area that displays entities and roles;
   wherein as an entity is placed on said second area, said query is updated to reflect identifying attributes of said entity, said identifying attributes identifying a unique instance of the entity,
   wherein groups are created as fields are placed on said second area, each said group being identified by a tab extending across, and contiguous with, icons representing fields comprised in the group, and
   wherein a new group is created if a field is placed to the left of an existing group,
   wherein an existing group is appended to if said field is placed to the right side of the existing group and the existing group is the entity group for the field,
   wherein a new field group is created if the field is placed to the right of an existing group and the existing group is not an entity group for the field,
   wherein said groups affect organization of results displayed by said query, and
   wherein, the explorer area includes a card icon to indicate a cardinality of the roles.

2. The computer system of claim 1, wherein when said selected entity is selected, said explorer area displays a base entity of said query.

3. The computer system of claim 2, wherein when a scalar field is added to said second area, said base entity changes to display an entity associated with said scalar field, and wherein when an aggregate field is added to said second area, said base entity is maintained.

4. The computer system of claim 1, wherein said entities and said roles are displayed in a hierarchical order, and wherein as a particular role are selected, dependent roles from said particular role are displayed.

5. The computer system of claim 1, further comprising a third area where filters are displayed to restrict results of said query.

6. The computer system of claim 5, wherein said filters are combined with logical operators.

7. A computer implemented method of creating a query using a user interface that is run against an entity relationship model, comprising:
   in a computing system displaying entities and roles associated with said entity relationship model;
   in the computing system displaying fields associated with said entities and roles;
   in the computing system creating a query as entities are placed on a design area within said user interface, the created query comprising fields identifying a unique instance of the entity;
   in the computing system updating said query as successive fields are placed on the design area within said user interface;
   in the computing system creating and displaying groups as fields are placed on the design area, each said group being identified by a tab extending across, and contiguous with, icons representing fields comprised in the group; and
   in the computing system displaying a card icons to indicate a cardinality of the roles;
   wherein a new group is created if a field is placed to the left of an existing group,
   wherein an existing group is appended to if the field is placed to the right side of the existing group and the existing group is the entity group for the field,
   wherein a new field group is created if the field is placed to the right of an existing group and the existing group is not an entity group for the field, and
   wherein the groups affect organization of results displayed by a query.

8. The method of claim 7, further comprising displaying a base entity of said query when a selected entity is selected.

9. The method of claim 8, further comprising:
   changing said base entity when a scalar field is added to said design area to display an entity associated with said scalar field; and
   maintaining said base entity when an aggregate field is added to said design area.

10. The method of claim 7, further comprising modifying said query in accordance with said groups.

11. The method of claim 7, further comprising:
    displaying said entities and said roles in a hierarchical order; and
    displaying dependent roles associated with a particular role when said particular role is selected.

12. The method of claim 7, further comprising displaying filters to restrict results of said query.

13. The method of claim 7, further comprising:
    running said query; and
    displaying results of said query in a reports area.

14. A computer readable storage medium comprising executable instructions for performing a method of creating and displaying results of a query run against an entity relationship model in a user interface, the executable instructions comprising instructions for performing the following:

displaying in a first area of the user interface entities and roles associated with said entity relationship model;

displaying in the first area of the user interface fields associated with said entities and roles;

creating a query as entities are dragged using a mouse from the first area to a design area within said user interface, the created query comprising fields identifying a unique instance of the entity;

updating a context of said query as said successive field are selected for use within said query;

updating said query as successive fields are dragged onto a design area within said user interface;

displaying a card icon to indicate a cardinality of the roles;

creating and displaying groups as fields are dragged onto the design area, each said group being identified by a tab extending across, and contiguous with, icons representing fields comprised in the group, a new group being created if a field is placed to the left of an existing group an existing group being appended to if a field is placed to the right side of the existing group and the existing group is the entity group for the field, a new field group is created if the field is placed to the right of an existing group and the existing group is not an entity group for the field, and the groups affect organization of results displayed by a query, providing filters to restrict data displayed by said query;

running said query; and displaying results of said query in a reports area.

* * * * *